(12) United States Patent
Lee et al.

(10) Patent No.: US 7,331,853 B2
(45) Date of Patent: Feb. 19, 2008

(54) VENTILATING SYSTEM

(75) Inventors: Gi Seop Lee, Seoul (KR); Kyung Hwan Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/135,363

(22) Filed: May 24, 2005

(65) Prior Publication Data

US 2006/0199512 A1 Sep. 7, 2006

(30) Foreign Application Priority Data

Feb. 7, 2005 (KR) ........................ 10-2005-0011266

(51) Int. Cl.
*F24F 7/00* (2006.01)
*F24H 3/02* (2006.01)

(52) U.S. Cl. ........................ 454/237; 165/54
(58) Field of Classification Search ................ 454/252; 165/47, 53–54, 58–59, 109.1, 146
See application file for complete search history.

(56) References Cited

U.S. PATENT DOCUMENTS

| 6,374,904 | B1 * | 4/2002 | Hurst | 165/78 |
| 6,401,802 | B2 * | 6/2002 | Cottingham | 165/54 |
| 2004/0256084 | A1 * | 12/2004 | Immell et al. | 165/78 |

FOREIGN PATENT DOCUMENTS

| DE | 3027447 | 2/1982 |
| DE | 3208392 | 9/1983 |
| EP | 1376023 | 1/2004 |
| JP | 5-223306 | 8/1993 |

OTHER PUBLICATIONS

U.S. Appl. No. 11/135,302 to Lee et al., which was filed May 24, 2005.

* cited by examiner

*Primary Examiner*—Steven McAllister
*Assistant Examiner*—Helena Kosanovic
(74) *Attorney, Agent, or Firm*—Greenblum & Bernstein, P.L.C.

(57) ABSTRACT

Ventilating system including a total heat exchanger at a region where an air supply duct, a passage for supplying outdoor air to a room, and an air discharge duct, a passage for discharging room air to an outside of the room, cross for making room air and outdoor air to heat exchange, an air supply fan connected to the air supply duct for drawing the outdoor air and discharging the outdoor air to the room, an air discharge fan connected to the air discharge duct for drawing the room air and discharging the room air to an outside of the room, and a flow guide between the air supply/discharge fans and the total heat exchanger for guiding flow directions of the room air and the outdoor air, thereby reducing a flow resistance and making the heat exchange efficient.

10 Claims, 7 Drawing Sheets

VENTILATING SYSTEM

CROSS-REFERENCE TO RELATED APPLICATION

This application claims the benefit of Korean Application No. P2005-0011266 filed on Feb. 7, 2005, which is hereby incorporated by reference as if fully set forth herein.

BACKGROUND OF THE INVENTION

1. Field of the Invention

The present invention relates to ventilating systems, and more particularly, to a ventilating system in which a structure thereof is improved for reducing a flow passage resistance, and enhancing a heat exchange performance.

2. Discussion of the Related Art

Air in a closed room is involved in reduction of oxygen content and increase of carbon dioxide content as time goes-by due to respiration of organisms, leading to impede respiration of the organisms. Therefore, if many people stay in a small space, such as an office or a car, it is required to replace polluted room air with fresh outdoor air from time to time. In general, the ventilating system is used for this.

Most of related art ventilating systems employ a system in which only room air is discharged to an outside of the room forcibly by using one far. However, the forcible discharge of only room air by using the fan results in direct discharge of cooled, or heated room air to the outside of the room.

Moreover, there has been a problem in that infiltration of outdoor air into the room through doors or gaps in window frames increases expense for heating or cooling the room.

Moreover, sudden inflow of cold or heated air from an outside of the room, changing a room temperature suddenly, causes people in the room to feel unpleasant. Particularly, if only room air is discharged to an outside of the room with windows or the doors being closed, introduction of fresh outdoor air is cut off, to cause shortage of oxygen.

SUMMARY OF THE INVENTION

Accordingly, the present invention is directed to a ventilating system that substantially obviates one or more problems due to limitations and disadvantages of the related art.

An object of the present invention is to provide a ventilating system which can reduce a flow passage resistance.

Another object of the present invention is to provide a ventilating system which can improve a heat exchange performance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a ventilating system includes a total heat exchanger at a region where an air supply duct, a passage for supplying outdoor air to a room, and an air discharge duct, a passage for discharging room air to an outside of the room, cross for making room air and outdoor air to heat exchange, an air supply fan connected to the air supply duct for drawing the outdoor air and discharging the outdoor air to the room, an air discharge fan connected to the air discharge duct for drawing the room air and discharging the room air to an outside of the room, and a flow guide between the air supply/discharge fans and the total heat exchanger for guiding flow directions of the room air and the outdoor air.

Preferably, the flow guide includes a first flow guide for guiding the room air passed through the total heat exchanger to the air discharge fan, and a second flow guide for guiding the outdoor air passed through the total heat exchanger to the air supply fan.

In more detail, preferably, the flow guide further includes a connection guide having one side connected to the first flow guide, and the other side connected to the second flow guide.

Preferably, the first flow guide and the second flow guide are connected to the connection guide with predetermined rounds respectively.

In another aspect of the present invention, a ventilating system includes a total heat exchanger at a region where an air supply duct, a passage for supplying outdoor air to a room, and an air discharge duct, a passage for discharging room air to an outside of the room, cross for making room air and outdoor air to heat exchange, an air supply fan connected to the air supply duct for drawing the outdoor air and discharging the outdoor air to the room, an air discharge fan connected to the air discharge duct for drawing the room air and discharging the room air to an outside of the room, and a flow distribution member for making a predetermined distribution of the air drawn by the air supply/discharge fans and being supplied to the total heat exchanger.

Preferably, the room air and the outdoor air have a uniform distribution throughout the total heat exchanger substantially when the room air and the outdoor air pass the total heat exchanger.

Preferably, the flow distribution member includes a first flow distribution member for distributing the outdoor air being introduced into the total heat exchanger, and a second flow distribution member for distributing the room air being introduced into the total heat exchanger.

In more detail, preferably, the first flow distribution member is in a first chamber into which the outdoor air is drawn, and the second flow distribution member is in a second chamber into which the room air is drawn.

Preferably, the first flow distribution members are mounted at predetermined intervals, and include at least one first flow distribution member with a size different from others.

Preferably, the first flow distribution members have sizes which become the larger as distances of the first flow distribution members from the air supply duct inlet become the farther.

Preferably, the first flow distribution members are tilted in a direction of the air supply duct inlet at predetermined angles.

Preferably, the second flow distribution members are mounted at predetermined intervals, and include at least one first flow distribution member with a size different from others.

Preferably, the second flow distribution members are tilted in a direction of the air discharge duct inlet at predetermined angles, and have sizes which become the larger as distances of the second flow distribution members from the air discharge duct inlet become the farther.

In another aspect of the present invention, a ventilating system includes a total heat exchanger for making outdoor air and room air to heat exchange, an air supply fan for drawing the outdoor air and discharging the outdoor air to a room, an air discharge fan for drawing the room air and discharging the room air to an outside of the room, a flow guide between the air supply/discharge fans and the total heat exchanger for guiding flow directions of the room air and the outdoor air, and a flow distribution member for making a predetermined distribution of the air drawn by the air supply/discharge fans and being supplied to the total heat exchanger.

Preferably, the air supply fan and the air discharge fan are positioned on one side of the total heat exchanger. Preferably, the room air and the outdoor air have a uniform distribution throughout the total heat exchanger substantially when the room air and the outdoor air pass the total heat exchanger.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
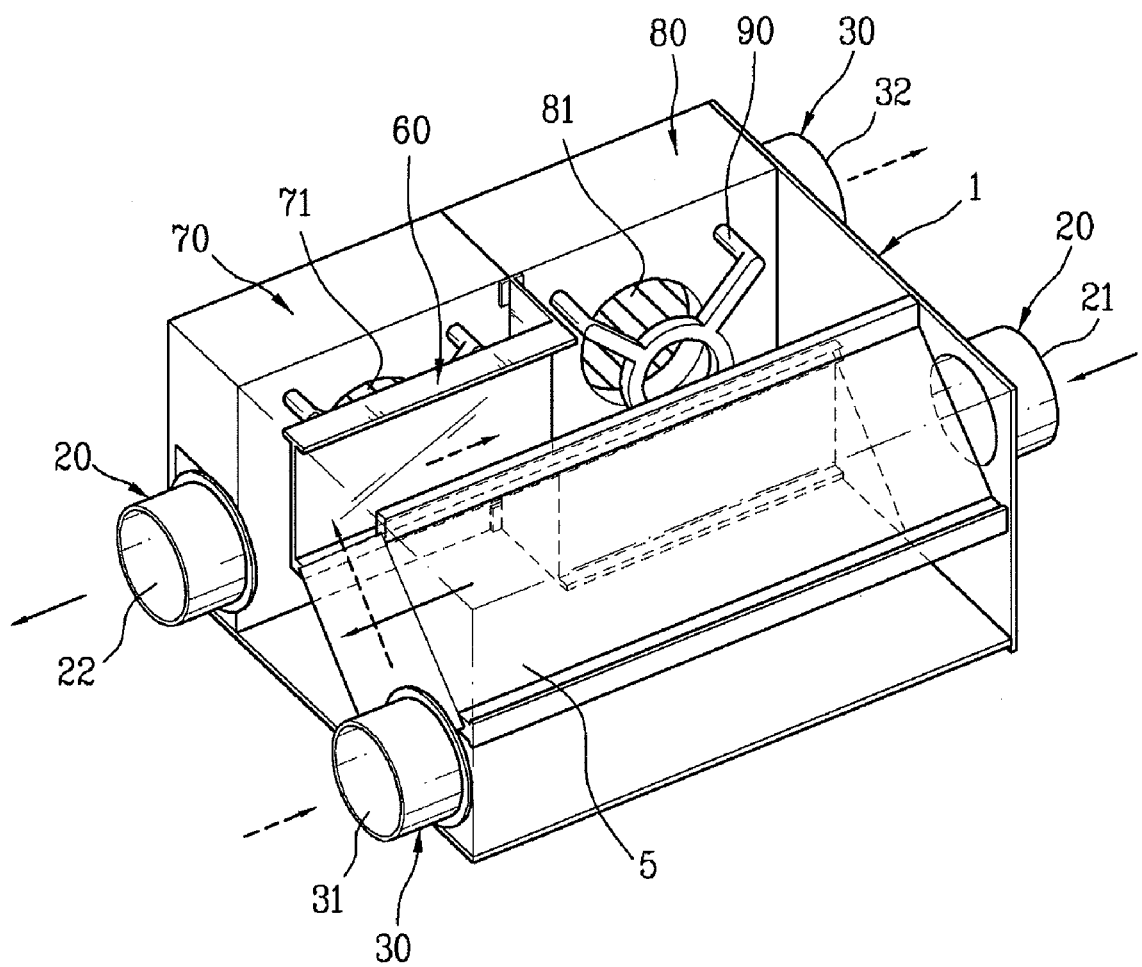
FIG. 1 illustrates a perspective view of a ventilating system in accordance with a preferred embodiment of the present invention.
Figure 2:
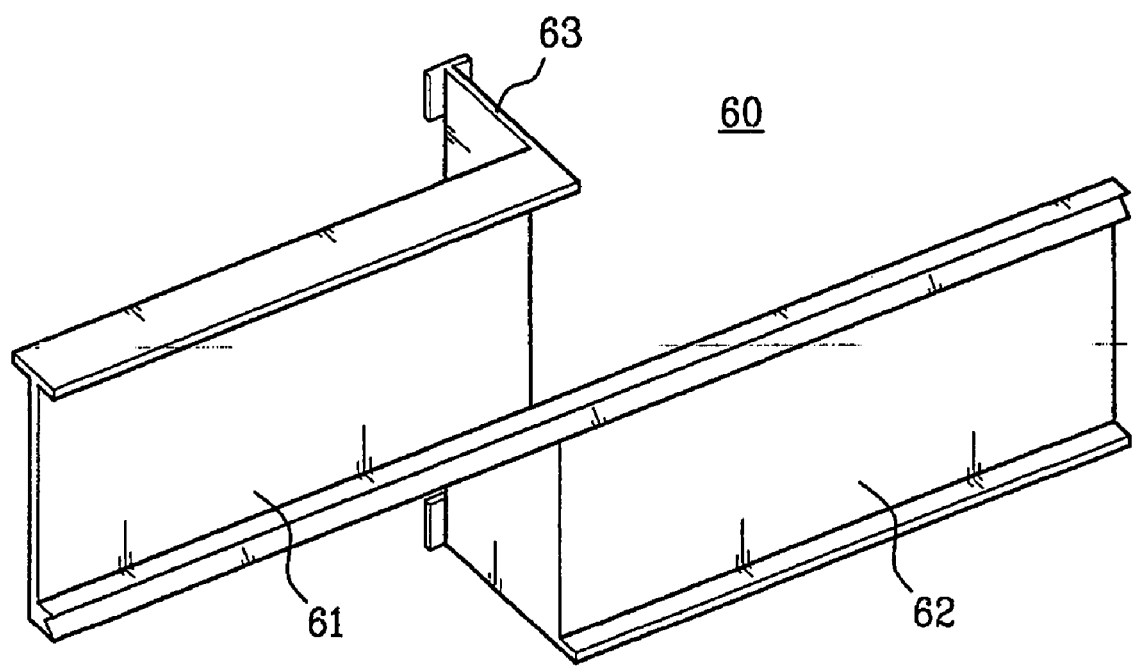
FIG. 2 illustrates a perspective view of the flow guide in FIG. 1.

FIG. 1 illustrates a perspective view of a ventilating system in accordance with a preferred embodiment of the present invention, and FIG. 2 illustrates a perspective view of the flow guide in FIG. 1.

Referring to FIGS. 1 and 2, the ventilating system 1 includes a total heat exchanger for making room air and outdoor air to heat exchange, and an air discharge duct 30 for discharging the room air to an outside of the room.

The total heat exchanger 5 is mounted at a region where the air supply duct 20 and the air discharge duct 30 cross, and has a flow passage (not shown) for passing the room air, and a passage (not shown) for passing the outdoor air. The total heat exchanger has a heat exchange layer for forming flow layers different from each other so that the room air and the outdoor air heat exchange by using differences of temperatures and humidities.

In the meantime, on one side of the total heat exchanger, there is a filter (not shown) for filtering foreign matters from air. Separate from the total heat exchanger, the filter is detachably mounted on the ventilating system.

The air supply duct 20 has one end formed with an air supply duct inlet 21 in communication with an outside of the room, and the other end formed with an air supply duct outlet 22. The air discharge duct 30 has one end formed with an air discharge duct inlet 31 in communication with the room, and the other end formed with an air discharge duct outlet 32 in communication with the outside of the room.

In the air supply duct 20, there is an air supply fan 71 for forced draw of outdoor air and discharge to the room, and, in the air discharge duct 30, there is an air discharge fan 81 for forced draw of polluted room air and discharging to the outside of the room. The air supply fan 71 and the air discharge fan 81 are in air supply/discharge fan housings 70, and 80, respectively. It is preferable that both the air supply fan housing 70 and the air discharge fan housing 80 are arranged on the same side of the total heat exchanger 5. In front of the air supply fan housing 70 and the air discharge fan housing 80, there are motors (not shown) for driving the fans respectively. Of course, the motors may be mounted in the air supply/discharge fan housings 70, and 80 respectively, or on motor mounts 90 in front of the air supply/discharge fan housings, respectively.

In front of the motor mounts 90, there are flow guides 60 for guiding flow directions of the room air and the outdoor air. The flow guide 60 includes a first flow guide 61 for guiding the room air from the total heat exchanger 5 to the air discharge fan 81, a second flow guide 62 for guiding the outdoor air from the total heat exchanger 5 to the air supply fan 71, and a connection guide 63 having one side connected to the first flow guide 61 and the other side connected to the second flow guide 62. The flow guide 60 serves to make air flow from the air supply fan 71 and the air discharge fan 81 smooth.

The operation of the ventilating system will be described.

When a power is supplied to the air discharge fan 81 at the time the room air is polluted to a certain degree, the room air is introduced into the air discharge duct 30 through the air discharge duct inlet 31, and crosses the total heat exchanger 5 in a diagonal direction. Then, the room air flows along the first flow guide 61 and the connection guide 63, and is discharged to an outside of the room through the air discharge duct outlet 32.

At the same time with this, the outdoor air is introduced into the air supply duct 20 through the air supply duct inlet 21, and crosses the total heat exchanger 5 in a diagonal direction. Then, the outdoor air flows along the second flow guide 62 and the connection guide 63, and is discharged to the room through the air supply duct outlet 22.

Figure 3:
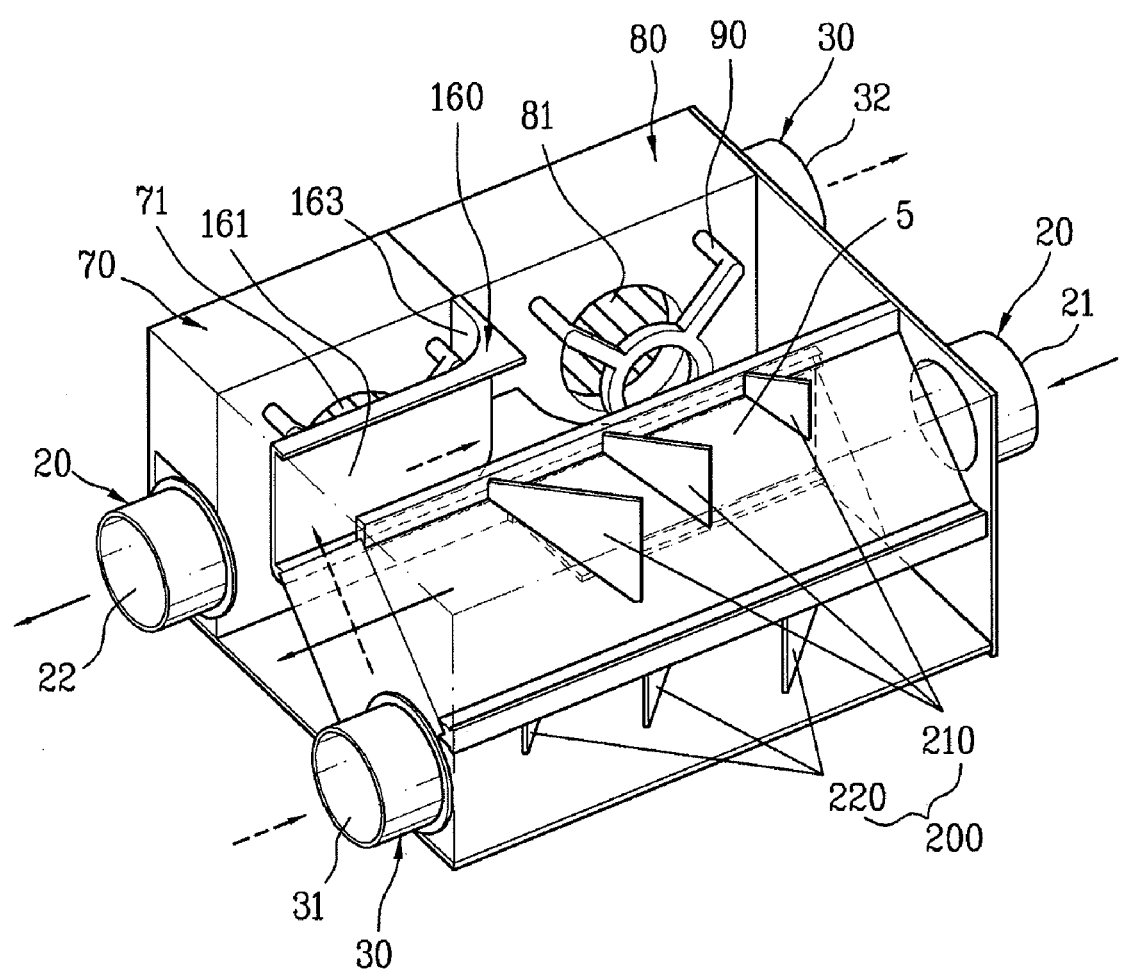
FIG. 3 illustrates a perspective view of a ventilating system in accordance with another preferred embodiment of the present invention.
Figure 4:
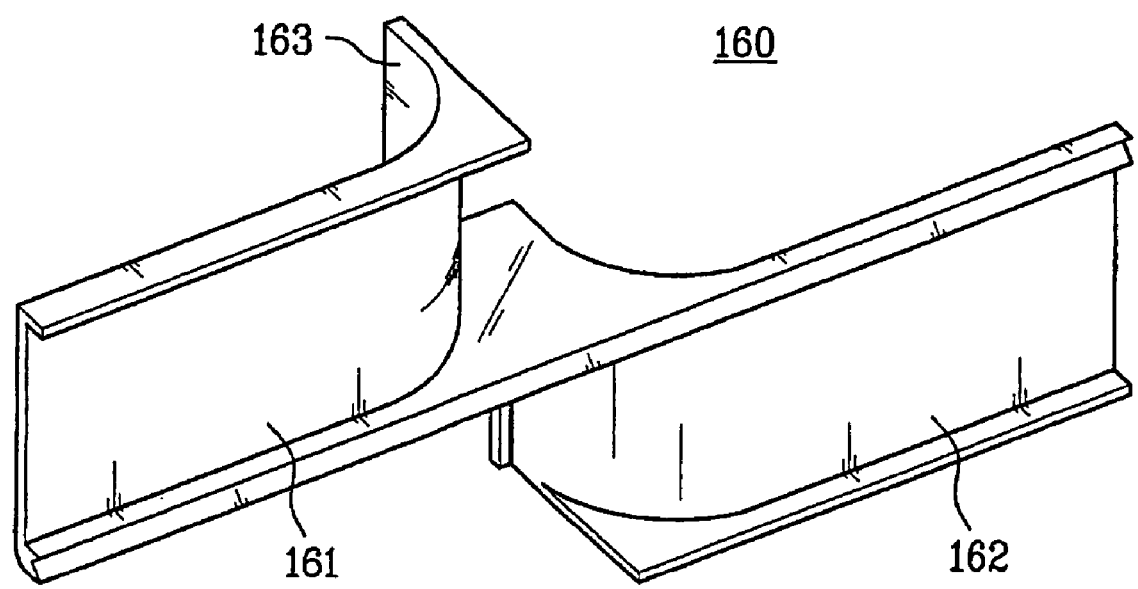
FIG. 4 illustrates a perspective view of the flow guide in FIG. 3.
Figure 5:
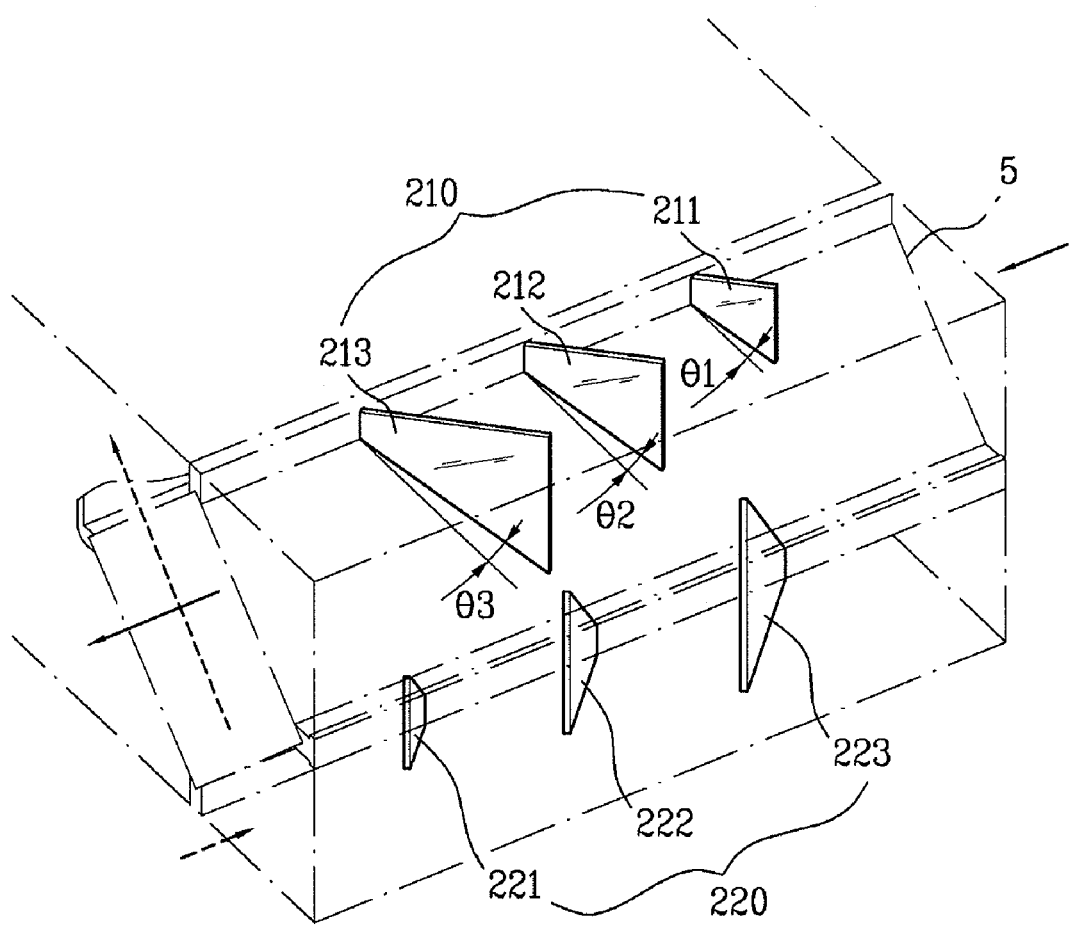
FIG. 5 illustrates a perspective view of the flow distribution members mounted in the ventilating system in FIG. 3.
Figure 6:
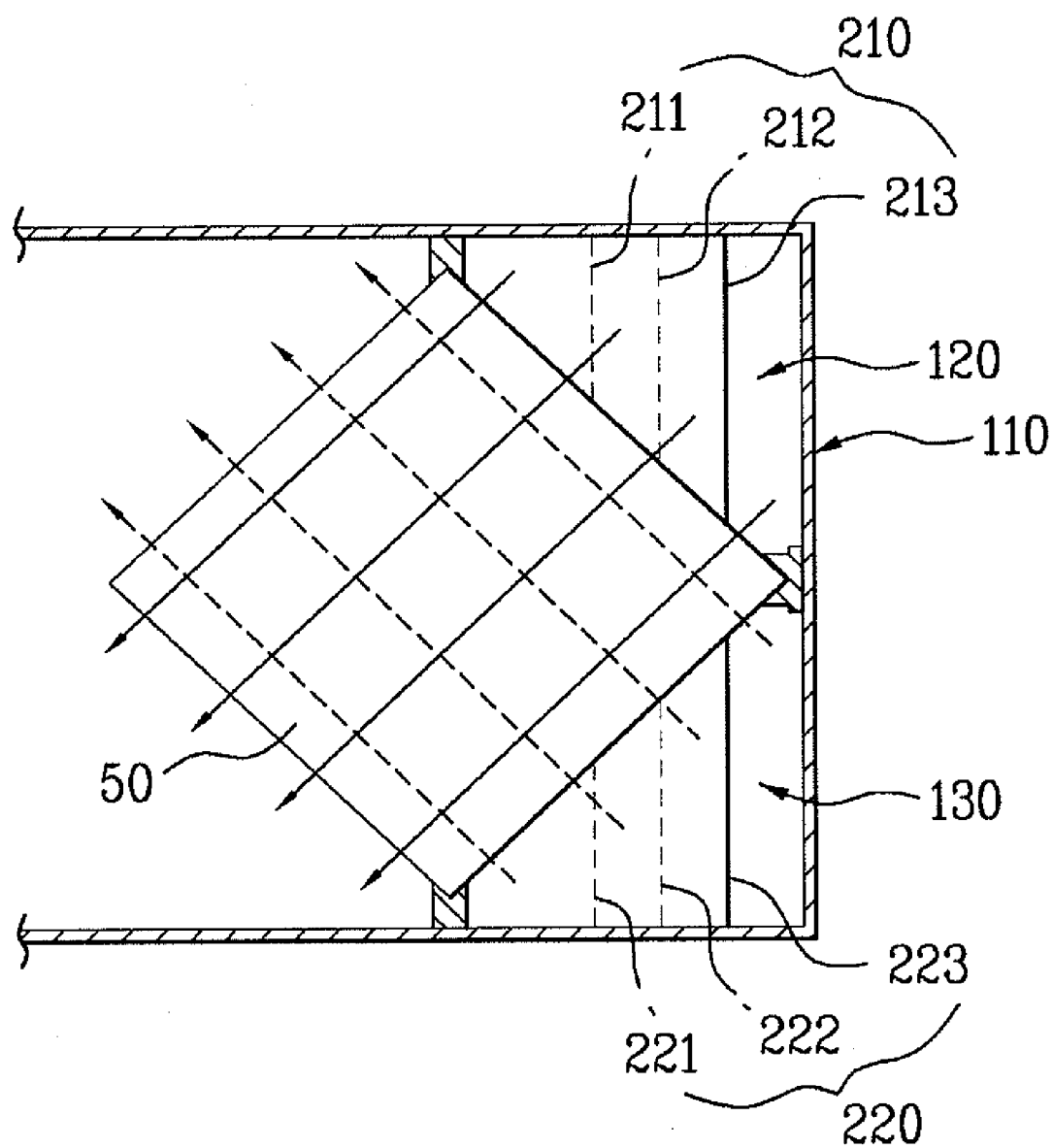
FIG. 6 illustrates a section of the flow distribution members mounted in the ventilating system in FIG. 3.

FIG. 3 illustrates a perspective view of a ventilating system in accordance with another preferred embodiment of the present invention, and FIG. 4 illustrates a perspective view of the flow guide in FIG. 3. FIG. 5 illustrates a perspective view of the flow distribution members mounted in the ventilating system in FIG. 3, and FIG. 6 illustrates a section of the flow distribution members mounted in the ventilating system in FIG. 3.

Referring to FIGS. 3 to 6, the ventilating system includes an air supply duct 20 for guiding outdoor air to a room, an air discharge duct 30 for guiding room air to an outside of the room, a total heat exchanger 5 for making the outdoor air and the room air to heat exchange, a flow guide 160 for guiding flow of the room air and the outdoor air, and a flow distribution member 200 for distributing the air supplied to the total heat exchanger.

Since the total heat exchanger 5, the air supply duct 30, and the air discharge duct 20 are identical to the foregoing embodiment, detailed description of which will be omitted.

The flow guide 160 in front of the fan housings 70, and 80 guides flow directions of the outdoor air and the room air, and includes a first flow guide 161, a second flow guide 162, and a connection guide 163.

The first flow guide 161 is spaced a predetermined distance away from a top of the air supply fan housing 70, and the second flow guide 162 is spaced a predetermined distance away from a bottom of the air discharge fan housing 80. The connection guide 163 has one side connected to the first flow guide 161, and the other side connected to the second flow guide 162, for preventing the air introduced into the air supply fan 71 and the air introduced into the air discharge fan 81 from mixing with each other.

It is preferable that the first flow guide 161 and the second flow guide 162 are connected to the connection guide 163 with predetermined rounds respectively, for reducing air resistance flowing along the flow guide, thereby reducing load on the motor of the fan, and power consumption.

In the meantime, the flow distribution member 200 on one side of the total heat exchanger 5 serves to distribute the air introduced into the total heat exchanger. In more detail, the flow distribution member 200 includes a first flow distribution member 210 for distributing the outdoor air introduced into the total heat exchanger, and a second flow distribution member 220 for distributing the room air introduced into the total heat exchanger.

The first flow distribution member 210 is arranged on an upper side of the total heat exchanger, in more detail, in a first chamber 120 where the outdoor air enters, at predetermined intervals. Preferably, there is at least one first flow distribution member 210, with a size different from others. The first chamber 120 is a space formed by the case 110, an exterior of the ventilating system, and one side of the total heat exchanger through which the outdoor air passes.

It is preferable that the first flow distribution member 211, 212, and 213 has a size which becomes the larger as a distance of the first flow distribution member 211, 212, and 213 from the air supply duct inlet 21 becomes the farther, and is tilted toward a direction of the air supply duct inlet 21 through which the outdoor air passes by a predetermined angle $\theta 1$, $\theta 2$, $\theta 3$.

Moreover, it is preferable that the first flow distribution member 211, 212, and 213 has a stream lined shape curved toward a direction of the air supply duct inlet 21 through which the outdoor air passes, for reducing a flow resistance.

In general, the outdoor air passed through the air supply duct inlet 21 is distributed on a side of the air supply duct outlet 22 more than on a side of the air supply duct inlet 21 in the total heat exchanger 5 due to a suction force of the air supply fan 71. Therefore, a size of the first flow distribution member 210 close to the air supply duct outlet 22 is formed larger, and tilted in a direction of the air supply duct inlet 21, for making uniform distribution of the outdoor air flowing into the total heat exchanger.

Of course, the first flow distribution member may have the same sizes and distributed at regular intervals. The tilted angles of the flow distribution member $\theta 1$, $\theta 2$, $\theta 3$ may, or may not be the same depending on air flow rate intended to control.

In the meantime, the second flow distribution member 220 is arranged on a lower side of the total heat exchanger, in more detail, in a second chamber 130 where the room air enters. The second chamber 130 is a space formed by the case 110, an exterior of the ventilating system, and one side of the total heat exchanger through which the room air passes. Since the second chamber 130 is separated from the first chamber 120, air in the first chamber and the second chamber does not mix with each other.

Alike the first flow distribution member 210, the second distribution member 221, 222, 223 are arranged at predetermined intervals, and have sizes at least one of which is different from others. It is preferable that the second flow distribution member 220 has a size which becomes the larger as a distance of the second flow distribution member 220 from the air discharge duct inlet 31 becomes the farther, and is tilted toward a direction of the air discharge duct inlet 31 through which the room air passes.

Figure 7:
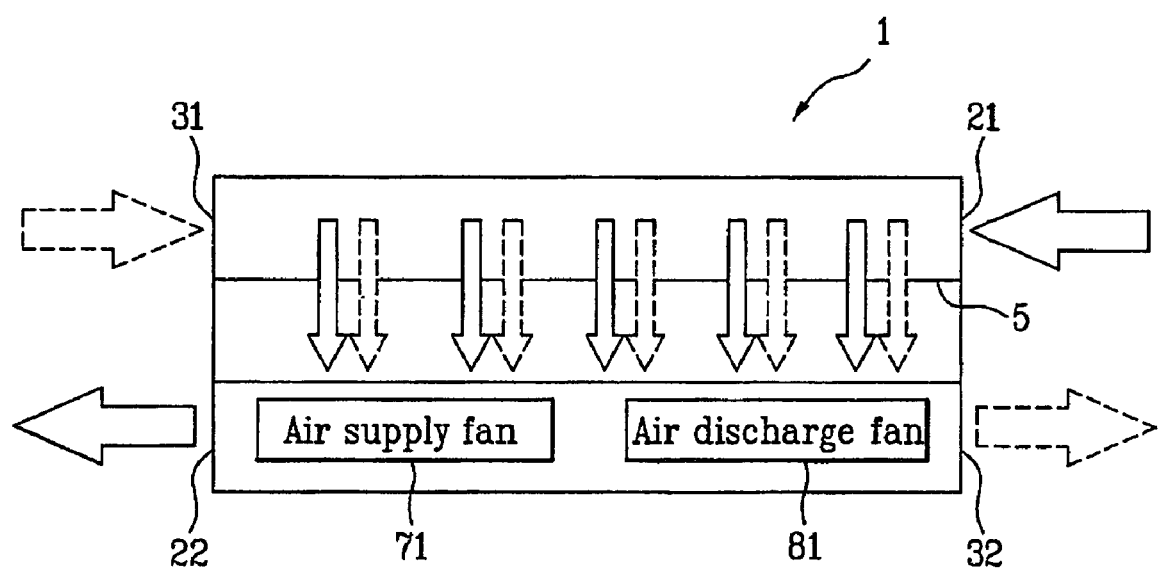
FIG. 7 illustrates a diagram showing air flow in the ventilating system of the present invention.

Referring to FIG. 7, the room air introduced into the total heat exchanger 5 through the air discharge duct inlet 31 is involved in heat exchange at the total heat exchanger, and discharged to an outside of the room through the air discharge duct outlet 32. In the meantime, the outdoor air introduced into the total heat exchanger through the air supply duct inlet 21 is involved in heat exchange at the total heat exchanger, and discharged to the room through the air supply duct inlet 22.

The room air being introduced into the total heat exchanger 5 has a uniform distribution throughout the total heat exchanger, and, alikely, the outdoor air being introduced into the total heat exchanger 5 has a uniform distribution throughout the total heat exchanger 5. According to this, actual flow rates of the room air and the outdoor air that are involved in the heat exchange become higher, to make the heat exchange active, and thermal efficiency high.

The operation of the ventilating system will be described.

The air supply fan 71 is put into operation, to draw outdoor air into the total heat exchanger through the air supply duct inlet 21. At the same time with this, the air discharge fan 81 is put into operation, to draw room air into the total heat exchanger through the air discharge duct inlet 31.

In this instance, the outdoor air and the room air are introduced into the total heat exchanger uniformly by the first flow distribution member 210, and the second flow distribution member 220, and involved in heat exchange in the total heat exchanger.

The outdoor air having heat exchanged in the total heat exchanger moves along the second flow guide 162, and is drawn into the air supply fan 71, and supplied to the room through the air supply duct outlet 22.

The room air having heat exchanged in the total heat exchanger moves along the first flow guide 161, and is drawn into the air discharge fan 81, and discharged to the outside of the room through the air discharge duct outlet 32.

It will be apparent to those skilled in the art that various modifications and variations can be made in the present invention without departing from the spirit or scope of the inventions. Thus, it is intended that, the present invention covers the modifications and variations of this invention provided they come within the scope of the appended claims and their equivalents.

As has been described, the ventilating system of the present invention has the following advantages.

First, the reduction of flow resistance of the outdoor air and the room air by means of the flow guides permits to reduce power consumption, and noise caused by air flow.

Second, the uniform distribution of the room air and the outdoor air being introduced into the total heat exchanger by means of the flow distribution members permits to improve thermal efficiency.

What is claimed is:

1. A ventilating system comprising:

a total heat exchanger at a region where an air supply duct, a passage for supplying outdoor air to a room, and an air discharge duct, a passage for discharging room air to an outside of the room, cross for making room air and outdoor air to heat exchange;

an air supply fan connected to the air supply duct for drawing the outdoor air and discharging the outdoor air to the room;

an air discharge fan connected to the air discharge duct for drawing the room air and discharging the room air to an outside of the room; and a plurality of flow distribution members partially partitioning space between a side surface of the total heat exchanger and a case forming an exterior of the ventilating system into several flow passages to make a substantially uniform distribution of the air drawn by the air supply and discharge fans and being supplied to the total heat exchanger, the plurality of flow distribution members includes a plurality of first flow distribution members for distributing the outdoor air being introduced into the total heat exchanger and a second flow distribution member for distributing the room air being introduced into the total heat exchanger, wherein, an air supply duct inlet of the air supply duct and an air discharge duct inlet of the air discharge duct are parallel with the side surface of the total heat exchanger along a length of the total heat exchanger, and the first flow distribution members have sizes which become larger as the distances of the first flow distribution members from the air supply duct inlet become greater.

2. The ventilating system as claimed in claim 1, further comprising a flow guide between the air supply/discharge fans and the total heat exchanger for guiding flow directions of the room air and the outdoor air.

3. The ventilating system as claimed in claim 2, wherein the flow guide includes;

a first flow guide for guiding the room air passed through the total heat exchanger to the air discharge fan, and a second flow guide for guiding the outdoor air passed through the total heat exchanger to the air supply fan.

4. The ventilating system as claimed in claim 3, wherein the flow guide further includes a connection guide having one side connected to the first flow guide, and the other side connected to the second flow guide.

5. The ventilating system as claimed in claim 4, wherein the first flow guide and the second flow guide are connected to the connection guide with predetermined rounds respectively.

6. The ventilating system as claimed in claim 1, wherein the first flow distribution member is in a first chamber into which the outdoor air is drawn, and the second flow distribution member is in a second chamber into which the room air is drawn.

7. The ventilating system as claimed in claim 1, wherein the first flow distribution member comprises a plurality of first flow distribution members mounted at predetermined intervals, and include at least one first flow distribution member with a size different from others.

8. The ventilating system as claimed in claim 1, wherein the first flow distribution member comprises a plurality of first flow distribution members tilted in a direction of the air supply duct inlet at predetermined angles.

9. The ventilating system as claimed in claim 1, wherein the second flow distribution member comprises a plurality of second flow distribution members mounted at predetermined intervals, and include at least one first flow distribution member with a size different from others.

10. The ventilating system as claimed in claim 1, wherein the second flow distribution member comprises a plurality of second flow distribution members tilted in a direction of the air discharge duct inlet at predetermined angles, and having sizes which become larger as the distance of a second flow distribution member from the air discharge duct inlet becomes farther.

* * * * *